United States Patent Office 2,797,182
Patented June 25, 1957

2,797,182

CADMIUM ANTHRANILATE CONTAINING ANTHELMINTICS

James E. Guthrie, Ashland, Ohio, assignor to Dr. Hess & Clark Inc., Ashland, Ohio, a corporation of Ohio No Drawing. Application June 14, 1955, Serial No. 515,559

9 Claims. (Cl. 167—53)

The present application is in part a continuation of application Serial No. 432,060 filed May 24, 1954, now abandoned, which is a continuation of application Serial No. 365,543, filed July 1, 1953, now abandoned.

The present invention relates to cadmium-containing anthelmintics, particularly adapted for oral administration to domestic animals such as swine and poultry for the removal of roundworms and tapeworms therefrom. More specifically, the present invention has especial relation to a superior group of cadmium-containing anthelmintics, namely those wherein, due to the type of binding known as chelation, the cadmium is more tightly bound than it is in simple inorganic salts or in nonchelated organic salts.

It is well known that domestic animals such as swine are commonly infested with a number of roundworm and tapeworm parasites. One of the most common roundworms, and probably the most universally distributed, of these parasites is *Ascaris lumbricoides* of swine. This worm exerts a deleterious effect on the animal inasmuch as infested swine fail to grow normally and, in some cases where a large number of these parasites are harbored, the animal's resistance is reduced to the point where death occurs.

The methods which have been used heretofore in the control of the roundworm parasite in domestic animals such as swine have entailed the administration of toxic agents such as sodium fluoride, phenothiazine and the like, particularly in the feed of the animals, so that the latter have been exposed to the danger of poisoning by the anthelmintic, particularly where the agent has not been very carefully controlled. Such control is difficult and frequently impossible in the ordinary use to which such agents have been put in feeding pens and on the farm. The expectation that the toxic anthelmintic would kill the roundworm is fulfilled, but the danger to the animal which is exposed is likewise encountered, and for this reason these materials have not found general acceptance by the stock producer.

Consequently, it is unexpected and surprising that the chelated cadmium anthelmintic compounds of the present invention which are not toxic to the host animal have been found to effectively eliminate the roundworm from infested domesticated animals, particularly swine, and that this result is achieved in high efficiency after but a few days of treatment. It is also surprising that chelated cadmium compounds are effective against tapeworms in animals.

A primary object of the present invention is the embodiment of a physiologically tolerable organic chelated cadmium anthelmintic compound for the elimination of roundworms and, more particularly, of *Ascaris lumbricoides* from infested swine. Another object is to treat animals for tapeworm infection.

This object and others which hereinafter become apparent are realized according to the present invention by bringing the said parasites into contact with a chelated cadmium anthelmintic compound in the digestive tract of the animal. To this end, the chelated cadmium anthelmintic compound may be introduced into the digestive tract as a single oral dose, administered for example in the form of a drench or of a tablet, or it may be mixed in the feed and thus administered over a period of several days. An advantage of the latter procedure is that the worms are gradually killed and are passed out over a period of several days, thus reducing the danger of intestinal obstruction from large masses of dead worms.

The following tables, Tables I and II, are illustrative of the anthelmintic activity of physiologically tolerable organic chelated cadmium salts within the scope of this invention.

In the procedure utilized in obtaining the data of Tables I and II, the test employed is the well-known procedure of Morris C. Hall and Winthrop D. Foster—"Efficacy of Some Anthelmintics," Jour. of Agric. Research, vol. 12(7): 1918. This method was reviewed by Moskey and Harwood in 1941: "Methods of Evaluating the Efficacy of Anthelmintics," Henry E. Moskey and Paul D. Harwood, Am. Jour. of Veterinary Research, vol. 2(2): 55–59.

As is understood in the veterinary art, this critical test which has been used by investigators for several years to arrive at the actual efficiency of anthelmintic preparations, utilizes each animal tested as its own control. For each animal, the worms eliminated in the feces are counted and then compared with the number of worms remaining in the animal at necropsy.

Table I shows the dosage—single oral dosage where indicated or dosage in the amount of feed—given to the test animals (pigs of the indicated weights), the test of Hall and Foster being followed. In those instances where the cadmium compound was added to the feed, the animals took all of the feed by mouth over a period varying from about 1 day to about 5 days. No significant differences have been found in the efficiency of treatment as indicated in the tables, whether the cadmium compound is administered in the feed over a relatively short period such as 2 days or over a longer period such as 5 days.

As is evident from Table I, the preferred chelated cadmium compound for the purposes of the present invention is cadmium anthranilate. This compound appears best to fulfill the requirements of safety, efficacy and economic feasibility. Cadmium anthranilate is a stable white crystalline material which, upon reduction of particle size, is a free-flowing powder. The efficacy of this preferred cadmium compound for the purposes of the present invention is shown in Table II.

TABLE I

*Efficacy of various chelated cadmium compounds for the removal of* Ascaris lumbricoides *from swine*

[NOTE.—Animal number 2 received the drug indicated below as a single oral dose. The remaining animals received the drugs in their regular ration.[1] All animals were necropsied when elimination of worms ceased, approximately two weeks following treatment.]

| Pig No. | Drug | Dosage (Grams) | Weight at Treatment (Pounds) | Duration of Treatment (Days) | Worms Eliminated after Treatment (Number) | Worms Present at Necropsy (Number) | Efficacy of Treatment (Percent) |
|---|---|---|---|---|---|---|---|
| 1 | 2-amino-5-chloro-benzoic acid cadmium salt | 6.0 | 170 | 5 | 6 | 2 | 75.0 |
| 2 | Mercaptobenzothiazole cadmium salt | 1.5 | 150 | 1 | 4 | 28 | 12.5 |
| 3 | Cadmium 8-hydroxy quinolate | 3.0 | 35 | 3 | 188 | 6 | 96.9 |
| 4 | do | 3.0 | 42 | 3 | 9 | 2 | 81.8 |
| 5 | do | 2.0 | 64 | 3 | 97 | 18 | 84.3 |
| 6 | Cadmium anthranilate | 3.0 | 40 | 2 | 11 | 0 | 100 |
| 7 | do | 3.0 | 51 | 3 | 5 | 0 | 100 |

[1] Each animal received the treatment in 10 pounds of the regular ration. No more feed was given until it had consumed the medicated feed.

TABLE II

*Efficacy of cadmium anthranilate for the removal of* Ascaris lumbricoides *from swine*

[NOTE.—Each pig received the amount of cadmium anthranilate indicated below in 10 pounds of their regular feed. No more feed was given until they had consumed all of the medicated ration. All animals were necropsied two weeks following the first day of treatment.]

| Pig No. | Dosage (Grams) | Weight at Treatment (Pounds) | Weight at Necropsy (Pounds) | Duration of Treatment (Days) | Worms Eliminated after Treatment (Number) | Worms Present at Necropsy (Number) | Efficacy of Treatment (Percent) |
|---|---|---|---|---|---|---|---|
| (1) | (2) | (3) | (4) | (5) | (6) | (7) | (8) |
| 8 | 0.5 | 13.0 | 18.5 | 9 | 7 | 20 | 25.9 |
| 9 | 1.0 | 17.5 | 21.5 | 8 | 39 | 3 | 92.8 |
| 10 | 1.5 | 19.5 | 23.0 | 8 | 2 | 0 | 100 |
| 11 | 2.0 | 21.0 | 32.0 | 7 | 11 | 0 | 100 |
| 12 | 2.5 | 21.0 | 24.5 | 8 | 75 | 0 | 100 |
| 13 | 3.0 | 23.5 | 27.0 | 8 | 7 | 0 | 100 |
| 14 | 3.5 | 24.0 | 27.5 | 8 | 31 | 0 | 100 |
| 15 | 3.0 | 40.0 | 54.0 | 2 | 11 | 0 | 100 |
| 16 | 3.0 | 51.0 | 66.0 | 3 | 5 | 0 | 100 |
| 17 | 2.5 | 75.0 | 107.5 | 4 | 4 | 0 | 100 |
| 18 | 2.5 | 109.5 | 140.0 | 3 | 6 | 1 | 85.7 |
| 19 | 1.5 | 32.5 | 46.0 | 6 | 12 | 1 | 92.3 |
| 20 | 2.0 | 18.5 | 22.5 | 8 | 15 | 0 | 100 |

From the data set forth in the tables, it may be seen that all the chelated cadmium compounds tested exerted an anthelmintic or vermicidal effect on *A. lumbricoides*, the aforesaid most common roundworm parasite of swine.

None of the animals exhibited any symptoms of intoxication after treatment. At necropsy, there were no gross pathological lesions which could be attributed to the effects of the treatment.

From the tables it can be seen that effective anthelmintic dosages vary from about 0.5 gram to about 6.0 grams or more per dosage unit, e. g. per 10 pounds of feed. The worms eliminated in the feces are counted and then compared with the number of worms remaining in the animal at necropsy.

From the weight at treatment shown in Table II and the mean daily gain, it is seen that with each of the compounds, a weight gain has been obtained. This is surprising in that a retardation of growth rate and reduced feed efficiency are sometimes experienced after treatment of pigs with the conventional anthelmintics, such as the fluorides, which have been used heretofore.

The complete absence of toxicity in the treatment of roundworms by the agent of the invention is surprising indeed and no toxic effects of any kind have been encountered in the studies made.

Tables I and II are illustrative of the unexpected and surprising results obtained in accordance with the invention by the inclusion of chelated cadmium compounds in the feed given to the pigs. Equally good results are obtained by administering of the chelated cadmium anthemintic materials in the form of a drench and the drench may be prepared and administered in the known manner to the animal which has been infested with the roundworm parasite.

Not only is the efficiency equally good when the chelated cadmium compounds are administered in the form of a drench but the weight gain of the animal under treatment is likewise found to be substantially the same in the treatment with the drench as in the case where the treatment is administered in the food.

It is particularly noteworthy that the cadmium materials in which the cadmium is bound more tightly than in the conventional salt structure, have proven to be extremely valuable by virtue of the high mean daily weight gain of the animals treated and by virtue of the high efficiency in the control of the roundworm infestation. It is known that the cadmium in the cadmium anthranilate is more tightly bound than it is in cadmium benzoate, for example. This type of binding is known as chelation. As hereinbefore indicated, the present invention is concerned exclusively with compounds involving this type of binding.

Table II, supra, sets forth only a representative small group of a large number of tests wherein cadmium anthranilate, in particular, was administered to worm-infested pigs and was found in all cases to exhibit a marked ascaricidal activity, good tolerability and acceptance (e. g. in admixture with feed) and essential freedom from toxicity at therapeutic levels (even upon continued adminstration beyond the preferred 3-day treatment period).

The cadmium chelates of the present invention, and more particularly, cadmium anthranilate, are well tolerated by farm animals other than swine. Thus, the therapeutic level of cadmium anthranilate has been given in the feed to female goats, heifers, rabbits, dogs and chickens, with no untoward effects.

Physiologically acceptable chelated cadmium compounds are also useful in treating animals infected with tapeworms. This was demonstrated as follows:

Day-old chicks were raised under conditions which precluded infection by parasites. After the birds were 1 to 3 or 4 pounds, they were given 50 cysticercoides of *Raillietina cesticillus* in water into the crop by means of a pipette. The birds were left alone for two weeks and then sorted into groups of 8–11 birds of about the same weight. One group of non-infected birds was used as a control. The birds were usually, but not always, fasted overnight and the cadmium compound administered as a capsule. Two weeks after treatment, the birds were necropsied and the tapeworms found in the intestines counted. Typical results are reported in Table III following.

TABLE III

| Number of Birds In Group | Mean Wt. at time of Treatment (grams) | Treatment | Mean Wt. Gain or Loss 14 days after Treatment (grams) | Tapeworms at Necropsy | Percent Efficacy |
|---|---|---|---|---|---|
| 10 | 1,462.0 | 0.1 gm. cadmium salt of 2-amino-5-chloro benzoic acid. | +208.5 | 20 | 78.4 |
| 10 | 1,466.5 | None | +282.5 | 93 | |
| 10 | 1,335.0 | 0.5 gm. cadmium mercapto benzothiazole. | +214.0 | 35 | 77.41 |
| 10 | 1,304.5 | None | +307.0 | 155 | |

In treating poultry, chelated cadmium compounds are preferably administered so that each bird receives a daily amount such that the cadmium content is about 0.03 gm. to about 0.5 gm.

Whatever animal is to be treated for roundworms or tapeworms, an effective daily dose generally is in the range of about 5 to 50 mg. per kilogram of body weight.

The treatment of animals infected with roundworms and/or tapeworms may be effected individually by unit dosage forms such as tablets and capsules. For ease of administration, however, it is preferred to add the cadmium compound to a feedstuff for the animal. In this way the treatment can be disguised and administration effected with essentially no reluctance on the part of the animal. Effective treatment in feed compositions is accomplished by determining the approximate daily food intake and adding, to such an amount of feed, the daily effective amount of cadmium. Feed compositions containing from about 0.003% to about 0.1% cadmium are useful in treating animals infected with roundworms or tapeworms.

Various changes and modifications of the invention can be made and, to the extent that such variations incorporate the spirit of this invention, they are intended to be included within the scope of the appended claims.

What is claimed is:

1. The method of eliminating tapeworms from infested animals which comprises contacting the said worms in said animal with a therapeutically effective amount of cadmium anthranilate.

2. The method of eliminating tapeworms from infested animals which comprises feeding said animals a feedstuff containing a therapeutically effective amount of cadmium anthranilate for one through five days.

3. The method of eliminating tapeworms from infested animals which comprises feeding said animals a feedstuff containing 0.01% to 0.35% by weight of cadmium anthranilate.

4. The method of eliminating tapeworms from a tapeworm infested animal which comprises feeding the animal from about 5 to 50 mgm. of cadmium anthranilate per kilogram of body weight of the animal.

5. An anthelmintic composition for administration to animals which comprises a mixture of cadmium anthranilate and an inert solid carrier.

6. The composition of claim 5 in which the carrier is a feedstuff.

7. An anthelmintic composition for administration to animals which comprises a feedstuff containing from 0.01% to 0.35% by weight of cadmium anthranilate.

8. An anthelmintic dosage composition comprising from 0.5 gram to 6.0 grams of cadmium anthranilate in a solid carrier.

9. An anthelmintic composition in unit dosage form comprising from 0.03 gm. to 0.5 gm. of cadmium anthranilate, per unit dose, combined with an inert solid carrier.

References Cited in the file of this patent

UNITED STATES PATENTS 2,696,455  Blair _____ Dec. 7, 1954